April 5, 1966  W. H. FRANCISCO  3,244,025
AUTOMATIC TOROIDAL-TYPE TRANSMISSION
Filed Dec. 31, 1963  3 Sheets-Sheet 1

INVENTOR.
WILLIAM H. FRANCISCO
BY
ATTORNEY

INVENTOR.
WILLIAM H. FRANCISCO

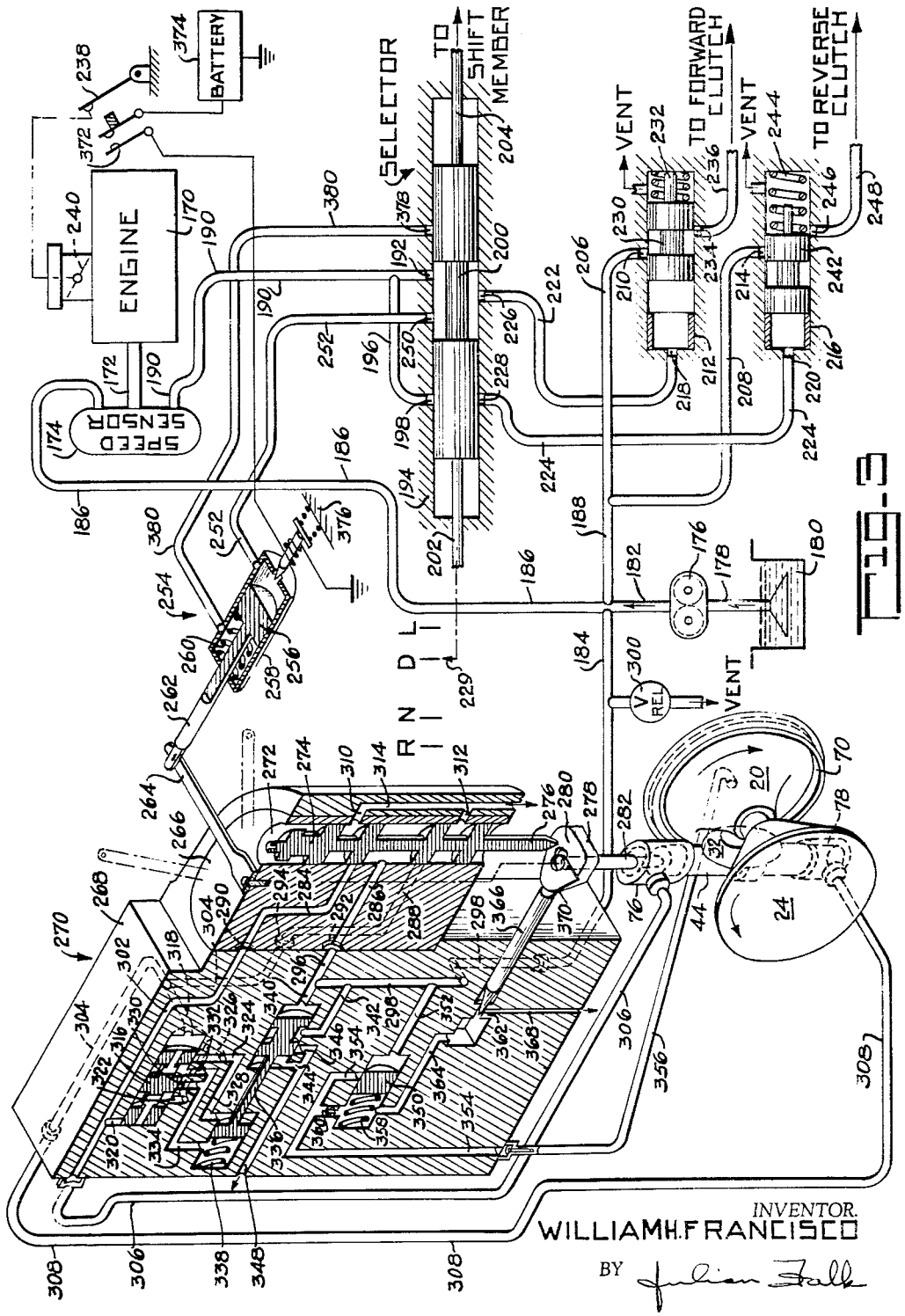

United States Patent Office 3,244,025
Patented Apr. 5, 1966

3,244,025
AUTOMATIC TOROIDAL-TYPE TRANSMISSION
William H. Francisco, Morris Plains, N.J., assignor to Curtiss-Wright Corporation, a corporation of Delaware
Filed Dec. 31, 1963, Ser. No. 334,895
25 Claims. (Cl. 74—690)

This invention relates to automatic transmissions and in particular to automatic transmissions of the toroidal type for application in transmitting power from a vehicle engine to the vehicle traction wheels.

Transmissions of the toroidal type generally comprise a pair of coaxial input and output drive members having facing toroidal or toric surfaces with a plurality of rollers disposed between and in friction contact with said surfaces and with each roller mounted for speed-ratio-changing movement to change the speed-ratio of the driving connection provided by the rollers between the toroidal members. The traction forces on each roller are opposed by a controllable force such that any unbalance between said control force and the traction forces causes the roller to move in a manner inducing speed-ratio-changing movement of the roller to a position in which the forces on said roller are again in balance. Reference may be made to U.S. Patent No. 3,008,337 which discloses a transmission of this type.

The present invention has for its prime object the provision of a smooth, stepless, variable speed, automatic transmission. The transmission of the invention generally comprises an input means including an input differential gear system associated therewith wherein the transmission input torque is divided so that only a portion of said input torque goes through the toroidal drive mechanism itself. The torque is recombined at the output end of the transmission through an output differential gear system. Transmission clutch means which have a braking action with elements of the output differential gear system are provided for selectively braking one of the elements of the output differential gear system for regulating the direction of rotation of the transmission output. Control means are provided wherein the operator may select one of several driving ranges with the transmission responding smoothly and efficiently to the selection made by the operator for driving the vehicle in accordance with said selection. The control means of the invention includes means for actuating the direction reversing mechanism in the transmission and for controlling hydraulic pressure thus providing a controllable force to balance the forces on the rollers for regulating the speed-ratio position of the rollers and thus the speed-ratio output. Means are also provided for insuring friction contact between the rollers and the toroidal disc members for all speed-ratio positions of the rollers relative to the toric surfaces of said disc members.

It is also an object of the invention to provide a novel control system for an automatic transmission of the toroidal type.

It is another object of the invention to provide a novel automatic transmission of the toroidal type and a control system therefor through which a variable hydraulic pressure is provided for controlling the speed-ratio position of the rollers.

Other objects and advantages of the invention will be best understood after reading and understanding the following detailed description with the accompanying drawings in which:

FIG. 3 is an illustration of the control system of the invention with portions thereof being shown schematically.

Figure 1:
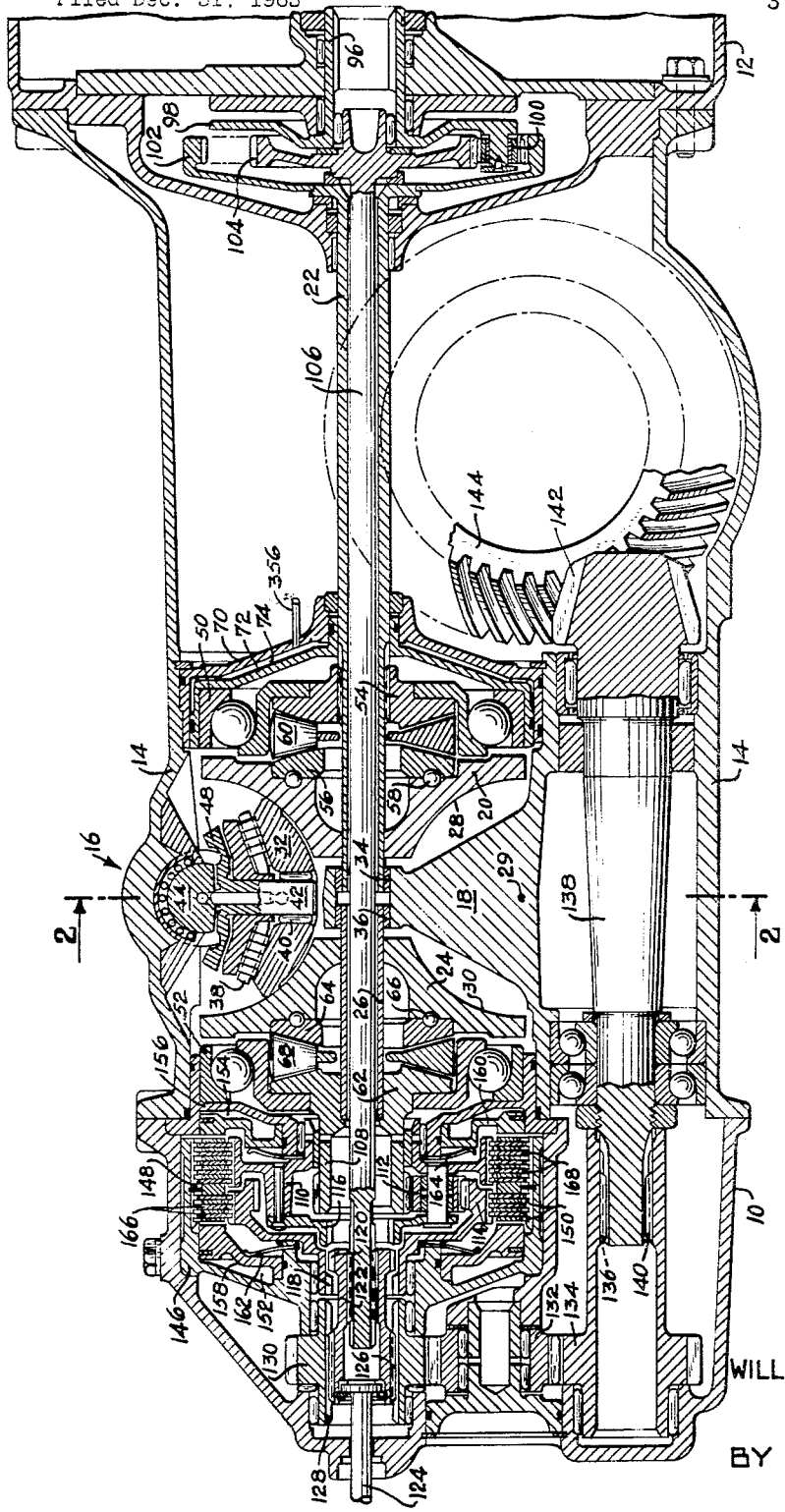
FIG. 1 is an axial sectional view of the transmission of the invention.
Figure 2:
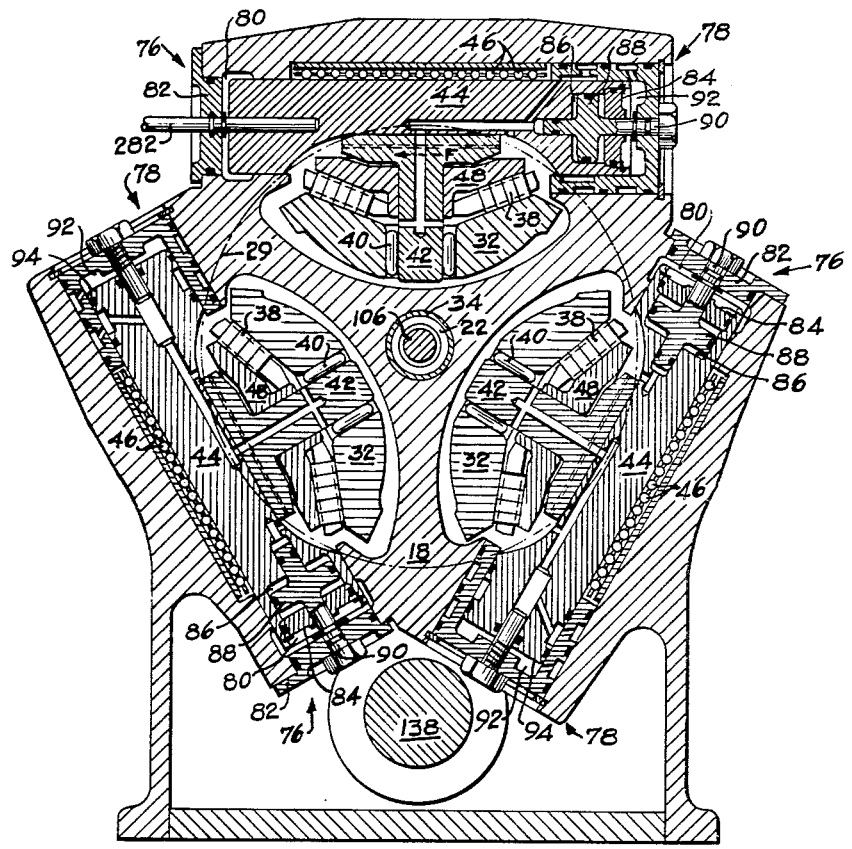
FIG. 2 is a sectional view of the transmission taken along line 2—2 of FIG. 1.

Referring first to FIGS. 1 and 2, the transmission shown therein comprises an outer housing including end sections 10 and 12 and an intermediate section 14. The toroidal drive section of the transmission is generally designated at 16 and is supported in a Y-shaped portion 18 (FIG. 2) of the intermediate housing 14. The toroidal drive unit 16 includes an input toroidal disc member 20 connected to a hollow input shaft 22 for rotation therewith and an output toroidal disc member 24 connected to a hollow output shaft 26 for rotation therewith with said hollow output shaft 26 being supported coaxially with the input shaft 22. The input toroidal disc member 20 has a toroidal surface 28 which preferably is generated by rotating a substantially circular arc about the common axis of the shafts 22 and 26 with the center of the generating arc tracing a circle 29 as the toric surface 28 is generated. The output toroidal disc member 24 has a similar toroidal surface 30 facing the input toroidal surface 28 and has substantially the same toric center circle 29.

A plurality of circumferentially-spaced rollers 32 are disposed between and in driving engagement with the toric surfaces of the disc members 20 and 24. Preferably, as illustrated in FIG. 2, three rollers 32 are provided between the toroidal disc members 20 and 24 although the invention is not limited to this number. At least one of the toroidal disc members is axially movable toward the other and preferably in the embodiment illustrated both of the toroidal disc members 20 and 24 are axially movable relative to one another and are therefore supported on their respective shafts 22 and 26 for relative axial movement along said shafts. The shafts 22 and 26 are supported by suitable bearings as illustrated with the intermediate housing section 18 providing bearing supports 34 and 36, respectively, for said shafts 22 and 26.

Each roller 32 is journaled by bearings 38 and 40 on a spindle 42, said bearings being designed to support their respective rollers 32 against radial loads and to support each said roller 32 against thrust radially outward along its spindle 42, the axis of each said spindle 42 being substantially radial relative to the transmission axis. Each roller spindle 42 is supported by a pivot shaft 44 for speed-ratio-changing movement of its roller in a first mode about the axis of said pivot shaft and relative to the toric surfaces 28 and 30. Relative to the transmission axis, each roller 32 is disposed on the radially inner side of its associated pivot shaft 44. The axis of each pivot shaft 44 is substantially tangent to the toroidal center circle 29 and is disposed in a plane perpendicular to the transmission axis. Thus, the pivot shafts 44 like the rollers 32, are circumferentially-spaced about the transmission axis, there being one pivot shaft 44 for each roller 32. Each pivot shaft 44 is supported on a substantially semi-cylindrical bearing 46 carried by the intermediate housing section 18 in the manner clearly illustrated in FIGS. 1 and 2. A more detailed description of the specific type bearing, such as bearing 46, may be found in copending application entitled Roller Support Mechanism for Toroidal Drive, Ser. No. 266,363, filed Mar. 19, 1963, now Patent No. 3,159,042.

Each roller spindle 42 has an end plate 48 which is disposed relative to its associated pivot shaft 44 so that its associated roller 32 is supported by the pivot shaft 44 for speed-ratio-changing movement with and about the axis of said pivot shaft 44 while also permitting a limited pivotal movement of the roller about the axis of the junction of the end plate 48 and the pivot shaft 44 to equalize the contact pressure of the rollers against the toric surfaces 28 and 30.

Each pivot shaft 44 also has a limited movement along its axis and its associated roller spindle end plate 48 is supported on the pivot shaft 44 so that movement of said pivot shaft 44 along its axis results in a corresponding movement of its roller 32 in this direction. Such movement of a pivot shaft 44 along its axis with its roller 32 may be termed, movement in a second mode.

The direction of rotation of the transmission is such that as viewed in FIG. 2 the input toric member 20 rotates clockwise and therefore the traction forces F exerted by the toric members 20 and 24 on, for example, the uppermost roller 32 in FIG. 2 are directed toward the left. Any unbalance of the traction forces on a roller and the forces along and on its pivot shaft 44 results in movement of the roller and its pivot shaft along the axis of said shaft. As fully explained in the aforementioned Patent 3,008,337, such second mode movement of a roller 32 along the axis of its pivot shaft 44 results in speed-ratio-changing pivotal movement of the roller with and about the axis of its pivot shaft 44 to a speed-ratio position in which said forces are again in balance.

As is known, speed-ratio-changing movement of the rollers may also be produced by tilting of each roller about an axis through or parallel to a line through the points of contact of the roller with the toric members 20 and 24. As is also disclosed in said above-mentioned patent, if such a roller tilt axis is offset from a line through the roller points of contact with the toric members, then the traction forces exerted by toric members 20 and 24 on each roller 32 apply a turning moment on the roller about its tilt axis which may be balanced by hydraulic pressure which generates a control force. Accordingly, it is within the scope of this invention to use such roller tilting to induce speed-ratio-changing precession of the rollers instead of shifting of each roller along the axis of its pivot shaft 44.

As illustrated, in FIG. 1, thrust bearings 50 and 52 are provided at each axial end of the toroidal unit 16 for transmitting thrust loads imposed on a transmission to the transmission housing. Thus, the thrust bearings 50 and 52 serve to absorb loading from the toroidal unit 16. Supported between the thrust bearing 50 and the input toroidal disc 20 are a pair of annular cam rings 54 and 56, cam ring 54 being attached by splines or the like to shaft 22, and cam ring 56 being keyed to input disc 20 by balls 58 or the like. The cam rings 54 and 56 each have a plurality of conically-shaped rollers 60 disposed between facing pairs of said cam rings. The relationship between cam rings 54 and 56 is such that any increase in the torque load transmitted results in a small relative rotation of the cam rings 54 and 56 producing relative axial movement between said cam rings to increase the axial loading of the input toroidal disc 20 toward the output toroidal disc 24 thereby increasing the contact pressure between the toroidal surfaces 28 and 30 and the rollers 32. Likewise any decrease in torque load results in a corresponding decrease in the axial loading of the toroidal discs 20 and 24 against the rollers 32. A similar cam and roller device is supported between the thrust bearing 52 and the output toroidal disc 24 to insure that clamping forces between the toroidal discs and the rollers are available during reverse torque flow such as when the vehicle is driving the engine instead of the engine driving the vehicle. Such may be the case, for example, when the vehicle is driving down hill without any acceleration of the vehicle due to depression of the accelerator pedal by the vehicle operator. The cam and roller device on the output side of the transmission comprises a pair of cam rings 62 and 64 which are similar to the cam rings 54 and 56 on the input side of the transmission with said cam ring 62 being suitably supported by bearing 52 and said cam ring 64 being keyed to output toroidal disc 24 by balls 66. A plurality of conically-shaped rollers 68 is provided for transmitting axial thrust from the cam ring 62 to the cam ring 64 which thrusts are thereby transmitted into clamping forces between the toroidal disc 24 and rollers 32 and the toroidal disc 20.

Supported between the intermediate housing wall 14 and the thrust bearing 50 are a pair of substantially annular-shaped members 70 and 72 with said annular member 72 being axially movable relative to the annular member 70. A substantially annular-shaped cavity 74 is provided between the annular-shaped members 70 and 72 and is suitably sealed at its radially inner and radially outer extremities, as illustrated, for receiving a fluid pressure therein. The annular-shaped member 72 bears against the thrust bearing 50 which in turn bears against the cam ring 54 so that axial movement of the annular member 72 toward the toroidal members is transmitted through the thrust bearing 50 and the cam and roller mechanism into axial loading of the toroidal members against the rollers 32. As will be explained in detail below, the fluid pressure received in cavity 74 is controlled for urging the annular member 72 toward the toroidal members for insuring that adequate contact between the toroidal members 20 and 24 and the rollers 32 is maintained for all speed-ratio positions of the rollers 32. The fluid piston mechanism itself forms no part of the present invention and reference may be made to said U.S. Patent No. 3,008,337, issued to Charles E. Kraus on Nov. 14, 1961, for a more detailed description of the function of the piston loader mechanism.

As stated above, speed-ratio-changing movement of the rollers 32 may be induced by translation of the pivot shafts 44 along their axes. For this purpose, a fluid control pressure differential may be applied to the ends of the pivot shafts 44 through suitable conduits (not shown in FIG. 2) which terminate at cylinders 76 and 78, respectively, at each end of each of the pivot shafts 44. Each cylinder 76 includes a fluid cavity 80 defined between the end of the pivot shaft 44 and a fixed insert member 82 with the end face 84 of the pivot shaft 44 serving as a piston face upon which the force of the hydraulic pressure in the cavity 80 may act to induce translational movement of the pivot shaft 44.

A sealed fluid cavity 86 is provided in one end of the pivot shaft 44, which cavity 86 contains a damping fluid sealed therein. A damping piston 88 is positioned on a shaft 90 which in turn is fixed to the insert member 82 so that the pivot shaft 44 may move axially relative to said damping piston 88. The damping piston 88 may be provided with a restricted passageway (not shown), between the axial faces of said piston 88 for permitting restricted flow of the damping fluid between said faces as the pivot shaft 44 moves axially relative to said damping piston 88. The damping piston 88 in fluid filled cavity 86 serves to dampen sudden axial movement of the pivot shaft 44 so that sudden axial movements of the pivot shaft 44 do not induce a change in the speed-ratio position of the rollers. Reference may be made to U. S. Patent No. 3,048,047, issued to Harry L. Richardson on Aug. 7, 1962 for a more complete description of the function of the damping mechanism.

A fluid cavity 92 similar to cavity 80 is provided for each of the cylinders 78 for receiving a fluid pressure therein, which pressure is normally lower than the fluid pressure in the cylinder 76 so as to provide a fluid pressure differential across the pivot shafts 44. The end face 94 of the pivot shafts 44 serves as a piston face upon which the force of the hydraulic pressure may act in the manner similar to that described above. The hydraulic control system for supplying the fluid pressure differential to the cylinder 76 and 78 will be explained in greater detail below.

Referring again to FIG. 1, a shaft 96 is provided at the input end of the transmission for transmitting torque from a motive means including vehicle engine and flywheel (not shown) to the transmission and integral with or fixedly secured thereto is a carrier member 98 which carrier member 98 in turn rotatably supports a plurality of planet pinion gears 100 thereon. A ring gear 102 is fixed to the hollow input shaft 22 and a sun gear 104 is fixed to a shaft 106 with such shaft 106 passing freely through the hollow input shaft 22 and the hollow output shaft 26 so as to be capable of rotating relative to said shafts 22 and 26. The input torque will therefore be transmitted from the input shaft 96 and carrier 98 and since the carrier 98 is the driving member of the planetary gear system at the input end of the transmission the input torque will be split so that it is distributed between the ring gear 102 and the gun gear 104. Therefore, only a portion of the input torque will be transmitted by the hollow input shaft 22 and through the toroidal unit 16 and the remaining portion of the torque will be transmitted through the transmission by the shaft 106. However, it should be understood that differential gearing other than the input planetary gear system may be used for dividing the torque between shafts 22 and 106.

The output torque from the toroidal unit 16 is transmitted from the output toroidal disc member 24 to the cam ring 64, the rollers 68 and cam ring 62. Integral with an axially extending portion of the cam ring 62 is a sun gear 108 which is the driving element of a planetary gear system for the output end of the transmission. The output planetary gear system further comprises a rotatable carrier 110 upon which there are rotatably supported a plurality of planet pinion gears 112 with the planet pinion gears 112 being supported for meshing engagement with the sun gear 108 and a rotatable ring gear 114. Radially inward of the planet pinion supports on the carrier 110 and axially spaced therefrom, the carrier 110 has an internally-toothed gear portion 116 fixed thereto and the ring gear 114 has an internally-toothed gear portion 118 radially inward from its toothed portion engaging the planet pinions 112 with said gear portion 118 being positioned adjacent the carrier gear portion 116 but axially spaced therefrom so that the gear portions 116 and 118 may be selectively engaged by an externally-toothed portion 120 on a sliding coupling gear 122. The sliding coupling gear 122 is hollow, as illustrated, and is provided with internal splines thereon which engage external splines on the input shaft 106 so that the sliding coupling gear 122 is in constant driving engagement with the shaft 106 but may be slid axially relative to said shaft 106. It should also be understood that other differential gearing may be used at the output end of the transmission instead of the planetary gear system illustrated.

A shaft member 124 is connected to one axial end of the slidable gear 122 for axially shifting said gear 122 into engagement with either the ring gear portion 118 or carrier gear portion 116 of the planetary gear set. The shift member 124 is suitably connected to the slidable gear 122 in a manner permitting free rotation of the gear 122 relative to the shift member 124 while controlling the axial position of said slidable gear 122. The shift member 124 is also suitably connected to a drive range selecting device of the transmission control system (selector—FIG. 3) by suitable means (not shown) for permitting the operator of the vehicle to select a desired driving range in a manner which will be more fully explained hereinafter.

In order to transmit power from the planetary gear system to the output end of the transmission the slidable gear 122 is further provided with an elongated set of external teeth 126 which mesh with an elongated internal set of teeth 128 on a hollow gear 130 so that the gear 122 is in constant meshing engagement with the gear 130 even when the gear 122 is moved axially for engagement with the ring gear portion 118 or the carrier gear portion 116. The gear 130 is supported for driving engagement with a gear 132 which is suitably supported for rotation on a portion of the transmission housing with the gear 132 in turn being supported for driving a gear 134. As illustrated, the gear 134 has an axially extending portion and is provided with a set of splines on the internal portion thereof, said splines being indicated at 136, and a transmission output shaft 138 is provided with a set of external splines 140 at one axial end thereof for meshing with the internal splines 136 on the gear 134 so that the gear 134 serves to drive the output shaft 138. The output shaft 138 is provided with a bevel gear portion 142 at the axial end opposite from the end having splines 140 which bevel gear portion meshes with inclined teeth on an enlarged bevel or hypoid gear 144, which gear 144 is suitably connected to an axle of a vehicle for driving the wheels of said vehicle. The transmission illustrated in FIG. 1 is designed for a vehicle having its engine in the rear portion thereof and therefore the gear 144 may be directly connected to the driving axle of the vehicle or to suitable differential gearing for driving said axle. However, it should be understood that the transmission as illustrated could be readily adapted for use in a vehicle having an engine mounted in the front end thereof with the power being taken off at some other point in the gear train other than that from gear portion 142.

In order to select the direction of rotation of the transmission output shaft 138, clutch means which have a braking action are provided for selectively braking the ring gear 114 or the carrier 110 of the output planetary gear system thereby changing the direction of rotation of the output from said planetary gear system. The clutch means includes a cylindrical or drum-shaped member 146 which has fixed thereto a backup member 148 and a plurality of axially-spaced clutch discs 150 with said backup member 148 dividing the clutch discs 150 into two axially spaced sets. Annular cavities 152 and 154 are defined by the drum-shaped member 146 and an annular housing portion 156 with annular shaped piston members 158 and 160 being respectively positioned in such cavities. The annular cavities 152 and 154 are suitably sealed between the drum-shaped member 146 and the annular housing portion 156 and their respective piston members 158 and 160 so that a fluid pressure may be received therein for actuating the piston members 158 and 160, as will be more fully explained hereinafter. Annular return springs 162 and 164 are respectively provided for each said piston members 158 and 160 to return the pistons from an actuated position when the fluid pressure on said pistons is decreased to a point wherein the force from said fluid pressure is less than the spring force.

The ring gear 114 has a plurality of annular axially-spaced clutch discs 166 fixed thereto with said clutch discs 166 being positioned between alternate discs 150 on the drum-shaped member 146 located between the backup member 148 and the brake piston member 158. The carrier 110 similarly has axially-spaced clutch discs 168 fixed thereto positioned in the same manner but located between the backup member 148 and the piston member 160. It will be apparent therefore that, when fluid pressure is applied to the cavity 152, the piston member 158 will be actuated to press the clutch discs 150 and 166 together and lock the ring gear 114 in a fixed position. Likewise, when fluid pressure is applied to cavity 154, the piston member 160 will be actuated to press clutch discs 150 and 168 together for locking the carrier 110 in a fixed position.

When it is desired to operate the transmission in the forward driving range, hydraulic pressure from the control system is applied to cavity 154 through suitable selection by the operator and the piston 160 is actuated to restrain the carrier 110 from rotating. The sun gear 108 will drive the ring gear 114 through the planet pinions 112 but in an opposite direction from the direction of rotation of the sun gear 108. However, since the sun gear 108 is drivably connected with the output disc 24 which is rotating in an opposite direction from the input rotation, the ring gear 114 will be rotating in the same direction as the primary or engine input. As explained above, the shift member 124 is connected to the selector (FIG. 3) so that, when the operator selects a forward driving range for actuating the piston 160 or the forward clutch, the shift member 124 will at the same time slide the slidable coupling gear 122 into engagement with the ring gear portion 118.

If it is desired to operate the vehicle in the reverse driving range, the selector (FIG. 3) is moved to the reverse driving range position at which time the shift member 124 will move the slidable coupling gear 122 into engagement with the carrier 110 through the gear portions 120 and 116 on the slidable coupling gear and carrier respectively. At the same time, the selector will open fluid pressure to the cavity 152, as will be explained below, for actuating the piston 158 to press the clutch discs 150 and 166 together for locking the ring gear 114. The sun gear 108 will now drive the carrier 110 and the planet pinions 112 relative to the ring gear 114 and in the same direction as the output disc 24 which is opposite to the direction of the primary input at shaft 96. The slidable coupling gear 122 will rotate in the same direction as the rotating carrier 110 due to their connection and it will be apparent that, through the gear train from gears 122, 130, 132, 134 to gear 142, the gear 144 will be driven in a direction opposite to that described above when the ring gear 114 was coupled for driving the gear 122 and the vehicle will now be driven in a reverse direction.

It will be apparent therefore, that by suitable selective positioning of the slidable coupling gear 122 and actuation of the pistons 158 and 160, forward and reverse driving ranges can be obtained with the speed-ratio output of the transmission being governed in either driving range by the speed-ratio position of the rollers 32 relative to the input disc 20 and the output disc 24. A neutral driving range, wherein the speed of the output shaft 138 is zero, may be obtained by positioning the gear portion 120 of the slidable coupling gear 122 at a position relative to the gear portion 118 on the ring gear 114 and the gear portion 116 on the carrier 110 so as not to be coupled with either the ring gear or carrier.

FIG. 3 shows the transmission control system with parts thereof being shown diagrammatically for purpose of illustration. The vehicle engine is diagrammatically illustrated at 170 and has suitably connected to the engine output shaft 172 a speed sensor 174. However, it should be understood that the speed sensor 174 may also be connected to the transmission output shaft 138 or the drive shaft for the vehicle wheels. The speed sensor 174 may be any known type speed sensor, such as, for example, that shown in U.S. Patent No. 2,657,699, which upon an increase in the speed of the engine drive shaft 172 serves to increase the fluid pressure at its outlet end. A pump 176, which may be a gear type pump, has its inlet line 178 connected to a fluid reservoir 180 and its outlet 182 connected to a plurality of pressure lines 184, 186 and 188 with the pressure line 186 being connected to the inlet side of the speed sensor 174. The outlet line 190 of the speed sensor 174 is connected to a port 192 in the selector housing 194 and said outlet line 190 also has a branch line 196 connected to a port 198 in the housing 194. A valve member 200 is positioned in the selector housing 194 with said valve member 200 having an extension 202 on one end thereof, which may be suitably connected to an operator positioning device such as a selector lever, a pushbutton selector system or the like, so that the vehicle operator may select a driving range indicated on, for example, the scale RNDL shown in FIG. 3 and position the selector valve 200 in accordance with a desired selection. The valve member 200 also has an extension 204 at its other end which, as indicated in FIG. 3, is connected to the shift member 124 for positioning the slidable coupling gear 122 as explained above. The extension 204 may be connected to the slidable coupling gear 122 through suitable linkage (not shown).

The pressure line 188 from pump 176 is further divided into two pressure lines 206 and 208 with line 206 being connected to a port 210 in the forward clutch servo valve housing 212 and line 208 being connected to a port 214 in the reverse clutch servo valve housing 216. Connected to ports 218 and 220 in the ends of the servo valve housings 212 and 216, respectively, are two pressure lines 222 and 224 which are in turn connected to ports 226 and 228 in the selector valve housing 194. The port 226 is positioned in housing 194 such that, when the valve 200 is moved so that the indicator 229 is at the drive (D) and low (L) positions, or the forward driving range positions, fluid pressure from the speed sensor 174 will be delivered through line 190 and port 192 to port 226, line 222 and port 218 and the forward clutch servo valve housing 212 for moving the valve member 230 axially in opposition to the spring force from spring 232 positioned in said servo valve housing 212. As the pressure in line 222 increases, the port 234 in the servo valve housing 212 will be uncovered and fluid pressure will enter the line 236 from the line 206 and port 210 and be transmitted to cavity 154 for actuating the forward drive piston 160, as explained above. The first increment of pressure change from the speed sensor 174 at speeds above the idle speed will cause the servo valve member 230 to translate to admit pressure from the pump 176 to the forward clutch mechanism. Thus, with the selector valve indicator 229 in the position illustrated in FIG. 3, when the operator depresses the accelerator pedal 238 to open the butterfly valve 240 on the engine 170 to increase the engine speed in a well known manner, the resultant increase in pressure from the speed sensor 174 will translate the forward clutch servo valve 230 for supplying pump pressure to fluid cavity 154. As the engine speed increases, the fluid pressure from the speed sensor 174 will maintain the translated position of the servo valve 230 for keeping the forward clutch piston 160 engaged.

When the selector valve member 200 is moved to a position for reversing the drive, the port 192 and line 222 for feeding the forward clutch servo valve will be closed off by one of the lands on the servo valve member 200 and the other of the lands on said valve member 200 will uncover the port 198 for line 196 and the port 228 for line 224 so that the speed sensor fluid pressure will now be directed to the reverse clutch servo valve. As the fluid pressure in line 224 increases due to an increase in engine speed, the fluid pressure will flow through line 224 through the port 220 in the reverse servo valve housing 216 and cause the reverse clutch valve member 242 to translate in opposition to the spring 244 to open the port 246 to line 248 for supplying the pump pressure to the fluid cavity 152 for actuating the reverse clutch piston 158 in a manner as explained above. The function of the fluid control system so far described is similar for both reverse and forward drive. As will be explained hereinafter, however, when the control system is set for reverse drive, the transmission will be maintained in a low speed ratio range. It will be apparent that, when the selector is moved from the neutral position (N) to a forward or reverse driving range, the slidable coupling gear is coupled to one of the output planetary gear elements and one of the clutches is actuated, the torque which was previously divided between the shafts 22 and 106 will be recombined with part of the torque flowing through the toroidal unit 16, the clutch engagement with the output planetary gear set and the engagement with gear 122 and the other part flowing through shaft 106 to gear 122.

When the selector valve indicator 229 is moved to the neutral driving range (N) position the ports to pressure lines 222 and 224 leading to the forward clutch servo housing 212 and the reverse clutch servo housing 216 will be closed by the lands on the servo valve 200. It will be apparent therefore, that no hydraulic pressure will be applied to the fluid cavities 152 and 154 for actuating the pistons 158 and 160 while the selector valve is in the neutral range position and therefore no torque will be transmitted from the toroidal unit 16 through the output planetary gear system. As was explained above, the selector valve extension portion 204 is connected to the shift member 124, and, when in the neutral range position, moves the slidable coupling 122 to a position wherein neither the ring gear 114 or the carrier 110 is engaged therewith so that this also prevents any torque from being delivered to the output shaft 138 from the toroidal unit. The load on the transmission from the vehicle wheels (not shown) is sufficient to prevent rotation of the shaft 138 due to the portion of the torque delivered to the shaft 106 when the transmission is in a neutral range.

As further shown in FIG. 3, a port 250 is also provided in the selector valve housing 194 and a line 252 is connected thereto. The other end of the pressure line 252 is connected to a ratio servo valve 254 so that fluid pressure will be supplied to one side of a piston 256 positioned in the housing 258 of said ratio servo valve 254 in opposition to the spring force on the spring 260 biased against the opposite side of the piston 256. It will be apparent that, when the selector valve indicator 229 is in the position illustrated in FIG. 3, or the drive position (D), fluid pressure from the speed sensor 174 will be supplied to the pressure line 252 and will cause the piston 256 and the ratio servo valve 254 to translate in accordance with the magnitude of the fluid pressure supply by said line 252.

The piston 256 of the ratio servo valve 254 has an axial extension 262 formed thereon which is pivotally connected to an arm 264 which is fixed to a rotatable ratio servo body 266 positioned in a housing 268 of the fluid pressure control assembly 270 so as to be rotatable relative to said housing 268. Thus, it will be seen that, when the piston 256 is caused to translate, the extension 262 will move the arm 264 to the rotatable ratio servo body 266 to rotate said body about its axis.

The rotatable body 266 is provided with an axially extending bore 272 in which there is slidably received a speed ratio servo valve member 274. The valve member 274 has an extension 276 which extends beyond the bore 272 and has a rounded end portion for engaging a cam member 278. The extension 276 of the servo valve member 274 engages the cam member 278 on an inclined ramp portion 280 on the top surface thereof which surface inclines in a counterclockwise direction, with respect to the axis of said cam member as viewed in FIG. 3, so that, as the rotatable body 266 is caused to rotate due to a translational movement of piston 256, the extension 276 will ride on the cam ramp 280 to cause the valve member 274 to translate in either of two directions within the bore 272. The cam member 278 is fixed to the shaft 282 which in turn is fixed to one of the pivot shafts 44 (FIGS. 2 and 3) so that, during translational movements and pivotal movements of the pivot shaft 44 relative to the pivot shaft axis, the cam member 278 will also translate or pivot with said pivot shaft and the valve member 274 will thereby be forced to translate along its axis in response to movements of the cam member 278.

The rotatable body 266 is provided with a plurality of fluid passageways 284, 286 and 288 with each of said passageways having an opening in the bore 272 at one end thereof and an enlarged opening or cavity at the outer periphery of the rotatable body 266 with said cavities being respectively designated at 290, 292, and 294. The passageway 286 communicates at its cavity 292 with a passageway 296 in the fluid control assembly housing 268 to which fluid pressure from pump 176 is supplied through pressure line 184 and the connecting passageway 298 in said housing 268. A relief valve 300 is provided in a line 184 to limit the maximum pressure supplied from the pump 176.

The passageways 284 and 288 communicate at their respective openings 290 and 294 with passageways 302 and 304, respectively, in the housing 268 which in turn have connected thereto line 306 and 308. The line 306 is connected to each cylinder 76 for the pivot shafts 44 for supplying fluid pressure thereto to initiate speed ratio-changing-movement of the rollers 32 in opposition to the tangential traction forces on each roller, which act upwardly as viewed in FIG. 3, and the line 308 is connected to each cylinder 78 of each pivot shaft 44 for supplying fluid pressure to the opposite end of each of said pivot shafts. The rotatable body 266 is also provided with vent passageways 310 and 312 which are connected to a master vent passageway 314. It will be apparent that, when the valve member 274 is translated in bore 272 to open one of the lines 284 and 288 to pump pressure from line 286, the other of the lines 284 or 286 will be opened to a vent passageway 310 or 312 so that, when fluid pressure is supplied to one cylinder 76 or 78 the pressure to the other cylinder will be opened to a vent passageway for draining fluid pressure from the other of said cylinders 76 or 78.

Means are also provided for controlling the line pressure from pump 176 to the cylinders 76 and 78. The pressure delivered to a passageway 302 and 304 in the housing 268 is connected to a shuttle valve 316 by a passageway 318 connected to the passageway 304 on one side of the shuttle valve 316 and a passageway 320 connected to passageway 302 at the other side of the shuttle valve 316. The shuttle valve 316 has outlet passageways 322 and 324 which are inter-connected by a passageway 326 to feed a passageway 328 and outlet passageways 330 and 332 which feed a passageway 334. The passageway 328 is connected to one side of the land on a portion of a pressure regulator valve 336, that being the piston member on the left side of the valve 336 as viewed in FIG. 3, and passageway 334 is connected to an opposite side of said land on the same portion of the valve 336. Fluid pressure from passageway 334 is supplemented by a spring 338 which applies a substantially constant force on said valve 336. Pump pressure is supplied to the right side of pressure regulator valve 336, as viewed in FIG. 3, through passageway 340 and 342 connected to the pump pressure passageway 298. Vent passageways 344 and 346 are connected to the opposite side of the valve portion from the passageways 340 and 342 and are in turn connected to a master vent passageway 348. The arrangement of the passageways connected to and from the shuttle valve 316 and the passageways within the valve 316 itself, as illustrated, is such that whichever of the passageways 302 or 304 has the higher pressure, the valve will assume a position wherein the higher pressure will be supplied to the spring side of the pressure regulator valve 336 and the lower pressure will oppose the spring force. It will be apparent therefore, that the pressure regulator valve 336 will be positioned in accordance with the differential pressure from the shuttle valve 316 plus the force of spring 338 and the pump pressure so that the pump pressure will be balanced for maintaining the pressure delivered to the cylinder 76 and 78 within desirable limits while requiring a minimum amount of energy for operation of the pump 176.

Means are further provided for altering the line pressure from the pump 176 to a satisfactory value for use by the piston loader mechanism shown at 70, 72 and 74 in FIG. 1 and described above. A ratio bias valve is provided and comprises a position valve member 350 which is responsive to fluid pressure supplied from a passageway 352 connected to the pump pressure at passageway 298 for regulating the fluid pressure supply to the passageway 354 connected to line 356 to the piston loader mechanism diagrammatically shown at 70 in FIG. 3. A spring 358 is positioned behind the piston 350 for providing a substantially constant reduction in the pressure delivered to the passageway 354 and the pressure in said passageway 354 is dropped across a fixed orifice 360. This reduced pressure may be further reduced through a variable orifice 362 connected across the pressure to line 356 by a passageway 364. A needle valve 366 is positioned adjacent the variable orifice 362 for movement in and out of the orifice to control the opening of the orifice and thus controlling the amount of fluid pressure which may be bled off to the vent passageway 368 connected to said orifice 362.

As further illustrated in FIG. 3, the needle valve 366 has an extension having a rounded portion thereon which engages a lobe 370 on the periphery of the cam member 278. The lobe 370 is designed so that, when the pivot shaft 344 pivots during speed-ratio-changing movement, the needle valve will be moved to vary the opening of the variable orifice 362 in accordance with the change in speed ratio. The system is designed so that the highest pressure will be delivered to the piston loader mechanism when the rollers are in a position of high output to input ratio which then corresponds to a maximum open position of a variable orifice 362. Thus, at this time the needle valve 366 will be at the lowest portion on the cam lobe 360. This will insure that contact pressure will be maintained between the rollers and discs during high output to input ratios at which time the contact pressure has a tendency to decrease, as explained in U.S. Patent No. 3,087,348, issued on Apr. 30, 1963. It will be apparent therefore, that the pressure in line 356 to the piston loader mechanism is a function of the roller speed ratio position and proportional to the pump outlet pressure as modified by the spring force and position of needle valve 36.

The operation of the control mechanism for a selector indicator position in the driving range (D) position will now be described.

With the engine having been started and at idle speed, the fluid pressure delivered by the speed sensor 174 is insufficient to fully overcome the force from spring 260 in the ratio servo valve 259. Thus, the piston 256 will be held by the spring 260 at its extreme right-hand position, as viewed in FIG. 3, with the ratio valve body 266 being rotated to its extreme clockwise position. Also, at this time, the fluid pressure from the speed sensor 174 is insufficient to overcome the force from spring 232 in the forward clutch servo so that at idle speed, no fluid pressure will be delivered to actuate the forward clutch piston 160. Thus, when at idle speed, no torque will flow from the transmission to the drive wheels of the vehicle. At substantially the first increment above idle speed, however, the fluid pressure from the speed sensor 174 to line 222 is sufficient to overcome the force of spring 232 and pump pressure will then flow through line 206, port 210, port 234 and line 236 to actuate the forward clutch piston 160 for delivering torque to the output shaft 138 for forward movement of the vehicle.

As is well know, to move the vehicle from a rest position, the accelerator pedal 238 is depressed to open the butterfly valve 240 and supply additional fuel to increase the engine speed. Thus, with the ratio servo valve 254 in its untranslated position the vehicle will initially begin to move forward in a low speed ratio or in underdrive since the force from the fluid pressure in cylinder 76 is insufficient to balance the traction force. As the engine speed increases, the fluid pressure from the speed sensor will increase thereby increasing the fluid pressure through lines 190 and 252 to the face of the piston 256 opposite to the spring side of said piston. The fluid pressure force will now begin to overcome the force from the spring 260 and cause the piston to begin to translate to the left, as viewed in FIG. 3, and rotate the ratio valve body 266 counterclockwise. This counterclockwise rotation of the ratio valve body 266 with the valve member 274 will cause the valve member 274 to ride up the inclined cam ramp 280 on the cam member 278 and the valve member 274 will move upwardly in the bore 272. As the valve member 274 continues its upward movement within the bore 272 the passageway 284 will be opened to the line pressure passageway 286 to increase the fluid pressure force to cylinder 76 in opposition to the tangential traction forces on the rollers and speed-ratio-changing movement of the rollers toward a higher speed-ratio position, or towards overdrive, will be initiated. In this condition the fluid pressure flow will be from line pressure passageway 286, passageway 284, passageway 302, line 306 to cylinder 76. At the same time passageway 288 connected to cylinder 78 will be opened to vent passageways 310, 314 to bleed pressure from cylinder 78 so that a pressure differential exists between cylinders 76 and 78 with the higher pressure being in cylinder 76 and thereby providing a force of greater magnitude than the opposing tangential traction forces.

As the force from the fluid pressure in cylinder 76 unbalances the traction force on the rollers, the pivot shaft 44 will begin to translate downwardly (FIG. 3) with its roller and the cam 278. In response to the downward movement of the cam 278, the valve member 274 will also move downward in the bore 272 to decrease the fluid pressure supply to cylinder 76. Thus, as the roller 32 and the pivot shaft 44 translate toward a new speed-ratio position, the movement of the valve 274 is such as to decrease the initial fluid pressure force so that the rollers will not overshoot the speed-ratio position wherein the opposing forces will be in balance and hunting of the rollers about this speed-ratio position will be prevented.

As the roller 32 and pivot shaft 44 pivot about the axis of the pivot shaft 44 toward overdrive, the direction of the pivotal movement will be in a counterclockwise direction about said axis so that the cam member 278 will pivot in a counterclockwise direction relative to the valve member 274. The counterclockwise rotation of the cam member 278 will cause the valve member to ride back down the cam ramp 280 and move the valve member 274 in a downward direction relative to bore 272 to restore the valve member 274 to its original stabilized condition illustrated in FIG. 3. The relationship between the movement of the valve member 274 and the cam member 278 is such that a change in the forces acting on the rollers or the valve member induces movement of the roller to return the valve member to its stabilized condition. The maximum limit of speed-ratio-changing movement toward overdrive or the highest output to input speed position in the embodiment illustrated is preferably reached when the vehicle attains a speed of approximately twenty five miles per hour. Thus, the limit of shifting of the toroidal unit preferably occurs between zero and approximately twenty five miles per hour and acceleration or speed beyond twenty five miles per hour is obtained through further depression of the accelerator pedal 238 to increase the engine speed with the toroidal drive unit being maintained at its maximum overdrive range. However, it should be understood that these limits may be varied and that which is set forth herein is used solely for purposes for an example of one preferred embodiment.

When it is desired to bring the vehicle to a stop or to substantially reduce the speed of the vehicle, the operator will remove pressure from the accelerator pedal 238 to permit the throttle 240 to close which will therefore reduce the speed of the engine. As the engine speed declines, the fluid pressure from the speed sensor 174 will also decline and, when the engine speed is reduced to a point below approximately twenty five miles per hour, the speed sensor pressure will not be sufficient to overcome the force from spring 260 in the ratio servo valve 254 and the piston 256 will begin to translate in response to the spring force which will be a translational movement to the right, as viewed in FIG. 3. In response to this movement of the piston 256, the ratio valve body 266 will be rotated clockwise about its axis with the valve member 274 relative to the cam member 278 and the valve member 274 will ride down the inclined portion of the cam ramp 280. The movement of the valve member 274 on the cam ramp 280 will lower the valve member 274 with respect to the ratio valve body 266 and open the passageway 288 to the line pressure passageway 286 to feed fluid pressure through passageway 304 and line 308 to cylinder 78. The fluid pressure force in cylinder 78 will act on the pivot shaft 44 in the same direction as the tangential traction forces on the rollers and induce the roller 32 and the pivot shaft 44 to translate upwardly and pivot toward underdrive or low ratio position. In translating upwardly and pivoting toward the underdrive position, the initial translational movement will serve to decrease the fluid pressure to cylinder 78 and the pivot shaft 44 and the cam 278 will pivot clockwise about the axis of the pivot shaft 44 which will cause the valve member 274 to begin to slide up the cam ramp 280 and restore the valve member 274 to a stabilized condition once the pivotal movement to underdrive is completed. This point will preferably be reached when the engine speed is reduced to approximately the idle speed range.

It will be apparent that, when the valve member 274 is lowered to supply fluid pressure to cylinder 78 to induce downshifting of the transmission, the fluid pressure supply to cylinder 76 will be opened to a vent, in that, passageway 284 will be opened to vent passageways 312 and 314 to provide a pressure differential across the ends of the pivot shafts 44. Also, as the engine speed approaches idle speed, the speed sensor pressure to the forward clutch servo valve will be reduced until the force from the spring 232 will cause the valve member 230 to translate to the left, as viewed in FIG. 3, close off the pressure supply port 210 and open the port 234 to the vent passageway in the forward clutch servo valve which will therefore reduce the fluid pressure to the forward clutch piston 160. The annular return spring 164 adjacent the forward clutch piston 160 will then disengage the forward clutch piston 160 from the clutch discs. The clutch mechanism will therefore be disengaged when the engine reaches idle speed. The reverse clutch mechanism including the reverse clutch servo valve will operate in the same manner when the engine speed is raised and lowered relative to idle speed for a selector position to operate the transmission for reverse direction of travel of the vehicle.

It will be apparent from the above that, when the selector indicator 229 is in the drive (D) position, the rollers will assume a speed-ratio position which is determined by the engine speed within a range of zero to approximately twenty-five miles per hour. A fluid pressure force will be automatically applied to the roller pivot shafts for initiating speed-ratio-changing movement as a function of the engine speed with the degree of said speed-ratio-changing movement being determined by the relative magnitude of the fluid pressure force and the opposing tangential force on each roller which is a function of torque. Further, speed-ratio-changing movement of the rollers and their pivot shafts will be fed back through pivotal and translational movement of the roller pivot shaft having the shaft extension 282 and cam 278 to alter the position of the valve 274 to restore said valve to a stabilized condition to vary the fluid pressure force so that, as the rollers reach the position wherein the opposing forces will be in equilibrium, the rollers will not overshoot this position or oscillate or hunt about said position. This will therefore result in smooth, stepless and efficient speed-ratio-changing of the rollers for the given engine speed range.

A passing range is also provided while operating in the forward drive (D) position. Since at speeds below approximately 25 miles per hour the transmission is in a low speed-ratio range, the passing range is provided while operating at speeds about or above the twenty-five mile per hour range. The passing range is set into operation by depressing the accelerator 238 to substantially its fullest extent thereby opening the throttle to the full open position and then further depressing the accelerator pedal 238 to actuate a kickdown switch 372. The kickdown switch 372 may be of a well known type in the art and is connected to a battery 374 and a kickdown valve 376. The kickdown valve 376 may be a solenoid-type actuated valve and may comprise a needle portion forming the armature thereof and having a coil for actuating the needle portion to open and close the port in the ratio servo valve housing 258 upon opening and closing of the kickdown switch 372. When the kickdown switch 372 is actuated, the kickdown valve 376 will be actuated to bleed off the fluid pressure supplied by pressure line 252 to the ratio servo valve 254. As the pressure is bled off, the spring 260 in the ratio servo valve will move the servo valve to the right as viewed in FIG. 3, and will turn the ratio valve body 266 in a clockwise direction about its axis. This rotation of the ratio valve body 266 will cause the valve member 274 to ride down the inclined cam ramp 280 and thereby move axially downward in the bore 272 to open the passageway 288 to the pump pressure in passageway 286 and thereby feed fluid pressure to the line 308 to cylinder 78. The pressure supplied to cylinder 78 will complement the tangential traction forces and cause the roller and its pivot shaft to pivot to a low-speed ratio range or downshift the transmission and unload the engine. This unloading of the engine will cause engine acceleration and as the engine speed increases the pressure from the speed sensor 174 will increase and thereby reapply pressure to the line 252 for opposing the spring force from spring 260 in the ratio servo valve 254. The increasing pressure will then cause the ratio servo valve to translate to cause the toroidal drive to upshift. However, the upshift of the transmission will lag behind the engine acceleration because of the bleed in the kickdown valve 376. As the engine reaches the maximum speed, the upshift of the transmission will also have reached its maximum again and the pressure from the engine speed sensor 174 will have completely overcome the bleed in the kickdown valve 376 to an extent sufficient to hold the ratio servo valve 254 fully translated. As the ratio servo valve translates in response to pressure from the engine speed sensor 174, the ratio servo body 266 will rotate counterclockwise and pressure will be again supplied to cylinder 76 in the manner explained above. Reduction of the throttle position or an elevation of the acceleration pedal 238, after having selected the kickdown position, will permit the kickdown valve to close and thereby close the bleed from the ratio servo valve 254. The closing of the kickdown valve 276 will permit the ratio servo valve 254 to translate to its maximum extent and the toroidal drive unit will again upshift to its highest speed ratio position or minimum reduction ratio.

A low driving range position is also provided wherein the transmission is maintained in its lowest speed ratio position. For selecting the low driving range position (L), the selector valve 200 is moved to a position wherein a port 378 in the housing 194 is opened by one of the lands on the selector valve member 200 for feeding pressure to a line 380 which is connected to the spring side of the ratio servo valve 254. When the valve member 200 is moved to this position the port 192 from the line 190 leading to the outlet of the engine speed sensor will also be open but the port 250 leading to the line 252 to the ratio servo 254 will be closed. The port 226 leading to the line 222 for the forward clutch servo is also open at this time so the transmission will be maintained in a forward driving range. As the engine speed increases, the pressure from the speed sensor 174 will increase and will flow from line 190 to the line 380 for supplying pressure behind the piston 256 of the ratio servo valve 254 and cause the piston to stay at its extreme right side position in the valve housing 258, as viewed in FIG. 3. The speed-ratio position of the rollers 32 will be controlled by the differential fluid pressure forces on the roller pivot shafts 44 and will maintain the rollers in the maximum underdrive position. The ratio servo valve 254 will not translate to the left to modify the position of the valve member 274. Any change in the forces on the rollers 32 will cause a movement of the valve 274 in a direction to oppose the change in forces and thus stabilize the rollers at the underdrive position. Thus, as long as the selector valve is in the low driving range position (L), the ratio servo valve piston 256 will remain in the position at its extreme right side of the valve housing 258, which may be termed the untranslated position, at which time the valve member 274 will operate to maintain the transmission in the maximum reduction ratio. As stated above, the valve member 256 will remain in this position as long as the selector valve 200 remains in low driving range position.

When the selector valve member 200 is moved to a position for reverse operation (R), one of the lands on said valve member 200 will close off fluid pressure from the engine speed sensor 174 to the line 252 for initiating translational movement of the ratio servo valve 254 in opposition to the spring force in the spring 260. Therefore, the piston valve member 256 of the ratio servo valve 354 will remain in an untranslated position or in a position at the right hand side of the ratio servo valve housing 258 in response to the spring force from the spring member 260. As explained above, when the valve member 256 is in this position, the ratio valve body 266 will be in such a position that the valve member 274 will not be caused to translate in the bore 272 in response to speed demand but will translate in response to changes in the forces acting on the rollers to vary the fluid pressure forces to oppose the changes in forces, as described above in relation to low (L) drive operation. Thus, since no engine speed sensor fluid pressure is supplied to the ratio servo valve 254, actuation of the ratio servo valve is controlled by the spring forces within it and it will remain in an untranslated position and the transmission will be maintained at the lowest speed ratio range. As was previously explained, when the selector valve member 200 is in a position for reverse operation, engine speed sensor pressure is provided to the reverse clutch servo mechanism through line 196, port 198, port 228 and line 224 to port 220. Also, at this time the shift member 124 will move the sliding coupling gear into a position for engagement with the carrier gear portion 116 of the transmission output planetary gear system so that the transmission output shaft 138 will drive the driving wheels of the vehicle in a reverse direction.

While I have described my invention in detail in its present preferred embodiment, it will be obvious to one skilled in the art, after understanding my invention, that various changes and modifications may be made therein without departing from the spirit and scope thereof. I aim in the appended claims to cover all such modifications.

I claim as my invention:

1. A variable speed transmission and control system therefor comprising:
   (a) input and output means for transmitting torque from a motive means to a driven means;
   (b) co-axial input and output members respectively supported for driving connection to said input and output means and having facing toric surfaces;
   (c) a plurality of circumferentially-spaced rollers disposed between and in contacting engagement with said surfaces for transmitting torque from the input member to the output member;
   (d) support means for each roller including pivot means providing for speed-ratio changing pivotal movement of said rollers across said toric surfaces, each roller support means also including means providing for movement of its roller in a second mode such that in response to movement in said second mode speed-ratio changing movement of said roller is initiated;
   (e) speed-ratio control means including, a source of fluid control pressure, means for applying a fluid control pressure force to each roller support means for controlling movement of each roller in its second mode, speed responsive means for supplying a fluid pressure force whose magnitude varies in accordance with the speed of one of said input and output means, means responsive to a fluid pressure force from said speed responsive means and operably connected to said means for applying a fluid control pressure force to each roller support means for automatically varying the fluid control pressure force in accordance with the speed of said one of input and output means, and means operably connected between at least one roller support means and said means for applying a fluid control pressure force to each roller support means and being responsive to pivotal and second mode movement of said roller means for automatically modifying the fluid control pressure force to each roller support means so that the rollers will be stabilized at a speed-ratio position determined in accordance with the speed of said one of said input and output means.

2. A variable speed transmission and control system therefor as recited in claim 1, wherein said means for supplying a fluid control pressure force to each roller support means comprising:
   (a) ratio control valve means including a valve housing containing a relatively movable servo valve member having relative movement in a first direction for increasing the fluid control pressure force to said roller support means for opposing the traction forces between said rollers and the toric surfaces and relative movement in a second direction for increasing the fluid control pressure force to said roller support means for applying a force in the same direction as the traction forces.

3. A variable speed transmission and control system therefor as recited in claim 2, wherein said means operably connected between at least one roller support means and said means for applying a fluid control pressure force to each roller support means comprises:
   (a) cam means connected to said one roller support means for pivotal and second mode movement therewith and having a cam ramp thereon, and said servo valve member engaging said cam ramp for movement relative to said cam ramp so that said servo valve member moves in said one and second directions with respect to said valve housing in response to relative movement between said cam ramp and said servo valve member.

4. A variable speed transmission and control system therefor as recited in claim 3 wherein said means responsive to a fluid pressure force from said speed responsive means comprises:
   (a) speed control valve means including a movable speed responsive valve member connected to said ratio control valve means for initiating relative movement between said valve housing and said servo valve member with accompanying relative movement between said servo valve member and said cam means such that said servo valve member is induced to move in either said first or second direction according to the movement of said movable speed responsive valve member and said cam means in response to pivotal and second mode movement of said roller support means initiating relative movement of said servo valve member in a direction opposite to the direction of movement of said servo valve member initiated by said movable speed responsive valve member so that speed-ratio changing movement of said rollers is initiated through relative movement of said servo control valve member in accordance with changes in the speed of said one of said input and output means with said servo control valve member being restored to its original position through relative movement between said cam means and said servo control valve member in response to pivotal and second mode movement of said rollers.

5. A variable speed transmission and control system therefor as recited in claim 4 further comprising:

(a) selector means having a first selector position for connecting a fluid pressure force from said speed responsive means to said movable speed responsive valve member for inducing movement of said speed responsive valve member in a first direction for initiating speed-ratio changing movement of said rollers toward a speed ratio position of high output speed relative to input speed, a second selector position for connecting a fluid pressure force from said speed responsive means to said movable speed responsive valve member for inducing movement of said speed responsive valve member in a second direction for initiating speed-ratio changing movement of said rollers toward a speed-ratio position of low output speed relative to input speed, and a third position wherein no fluid pressure force is supplied to said speed responsive valve member and said speed control valve means including means for maintaining said speed responsive valve member in a position for preventing speed-ratio changing movement of said rollers from a maximum speed-ratio position of low output speed relative to input speed.

6. A variable speed transmission and control system therefor comprising:

(a) input and output means for transmitting torque from a motive means to a driven means;

(b) co-axial input and output members having facing toric surfaces, said input member being operably connected to said input means and said output member being operably connected to said output means;

(c) a plurality of circumferentially-spaced rollers disposed between and in driving contact with said surfaces for transmitting torque from the input member to the output member;

(d) support means for each roller including pivot means providing for speed-ratio-changing pivotal movement of said roller across said toric surfaces, each roller support means also including means providing for movement of its roller in a second mode in response to changes in the traction forces between said roller and said toric surfaces such that in response to movement in said second mode, speed-ratio-changing movement of the roller is initiated;

(e) speed-ratio control means including a source of fluid control pressure operatively connected to each roller support means for applying a fluid pressure force thereto for controlling movement of each roller in its second mode;

(f) speed responsive means including a source of fluid pressure whose magnitude varies with variations in the speed of one of said input and output means and said speed responsive means being operably connected to said speed-ratio control means for regulating said speed-ratio control means in accordance with the magnitude of said speed responsive means source of fluid pressure such that for increases in the speed of said one of said input and output means the speed-ratio position of said rollers is automatically controlled for providing an increase in the speed of said output means relative to the speed of said input means; and (g) means operatively connected to said speed-ratio control means for automatically varying the fluid control pressure operatively connected to each roller support means in response to pivotal and second mode movement of said rollers.

7. A variable speed transmission and control system therefor comprising:

(a) input and output means for transmitting torque from a motive means to a driven means;

(b) co-axial input and output members having facing toric surfaces and respectively supported for driving connection with said input means and said output means;

(c) a plurality of circumferentially-spaced rollers disposed between and in contacting engagement with said surfaces for transmitting torque from the input member to the output member;

(d) support means for each roller including pivot means providing for speed-ratio changing pivotal movement of said rollers across said toric surfaces, each roller support means also including means providing for movement of its roller in a second mode in response to changes in the traction forces acting on said rollers such that in response to movement in said second mode speed-ratio changing movement of said roller is initiated;

(e) speed-ratio control means including a source of fluid control pressure, a fluid pressure control housing including a relatively movable first valve means for applying a fluid control pressure force to each roller support means in accordance with the relative movement of said first valve means for initiating second mode movement of said rollers in response to changes in the relative magnitude of said fluid control pressure force, second valve means movable in response to a fluid pressure force whose magnitude varies in accordance with the speed of one of said input and output means and said second valve means being operably connected to said fluid pressure control housing for initiating relative movement of said first valve means in either of two directions to automatically vary the fluid control pressure force on each roller support means in response to changes in the speed of said one of said input and output means for initiating speed-ratio changing movement of said rollers in accordance with the direction of relative movement of said first valve means; and means operably connected between said first valve means and at least one of said roller support means for moving said first valve means in either of two directions opposite to the relative movement initiated by said second valve means in response to pivotal and second mode movement of said rollers to restore said first valve means to its original position so that the speed-ratio position of said rollers will be automatically controlled for changes in the speed of said one of said input and output means.

8. A variable speed transmission and control system therefor comprising:

(a) input means for transmitting torque from a motive means;

(b) output means for transmitting torque from said input means;

(c) an input toroidal disc drivably connected to said input means and having a toric surface thereon;

(d) an output toroidal disc drivably connected to said output means and having a toric surface thereon facing the toric surface of said input toroidal disc;

(e) a plurality of circumferentially-spaced rollers disposed between and in contacting engagement with said toric surfaces for transmitting torque from said input toroidal disc to said output toroidal disc;

(f) support means for each roller including a pivot shaft providing for speed ratio changing pivotal movement of said rollers across said toric surfaces in response to changes in the relative magnitude of the forces acting on said rollers;

(g) speed-ratio control means including a source of fluid control pressure, first valve means for directing said fluid control pressure to said roller pivot shafts in accordance with the relative position of said first valve means for inducing speed-ratio changing movement of said rollers, a source of fluid speed pressure whose magnitude varies in accordance with the speed of one of said input and output means, second valve means connected to said first valve means with said second valve means being responsive to changes in the magnitude of said fluid speed pressure to vary the position of said first valve means so that said first valve means may be set to a position for directing fluid control pressure to induce speed-ratio changing movement of said rollers in accordance with the fluid speed pressure; and (h) means operably connected to said first valve means for modifying the position of said first valve means in response to movement of said rollers so that the speed-ratio position of said rollers will be maintained in a position for automatically maintaining the transmission output speed in accordance with the fluid speed pressure, whereby the speed-ratio position of said rollers will be automatically varied in accordance with the speed of said one of said input and output means.

9. A variable speed transmission and control system therefor comprising:

(a) input means for transmitting torque from a motive means;

(b) output means for transmitting torque from said input means;

(c) an input toroidal disc drivably connected to said input means and having a toric surface thereon;

(d) an output toroidal disc engageable for driving connection with said output means and having a toric surface thereon facing the toric surface of said input toroidal disc;

(e) a plurality of circumferentially-spaced rollers disposed between and in contacting engagement with said toric surfaces for transmitting torque from said input toroidal disc to said output toroidal disc;

(f) support means for each roller including a pivot shaft providing for speed ratio changing pivotal movement of said rollers across said toric surfaces in response to changes in the relative magnitude of the forces acting on said rollers;

(g) means for changing the direction of rotation of said output means relative to said input means;

(h) speed responsive means for supplying a fluid control pressure force including means for regulating said fluid control pressure force in accordance with the speed of one of said input and output means;

(i) speed ratio control means including means for applying a differential fluid pressure control force to said roller pivot shafts for inducing speed-ratio-changing movement of said rollers;

(j) means for actuating said means for changing the direction of said output means relative to said input means and including means responsive to said fluid control pressure force from said means for regulating said fluid control pressure force; and (k) selector means for selectively directing fluid control pressure for regulating said fluid control pressure force for automatically controlling said speed ratio control means and for selectively directing fluid control pressure to said actuating means such that the speed and direction of rotation of said output means may be automatically regulated according to the position of said selector means.

10. A variable speed transmission and control system therefor as recited in claim 9 wherein said means for changing the direction of rotation of said output means includes:

(a) a planetary gear set comprising a plurality of relatively rotatable gear means; and (b) clutch means responsive to fluid control pressure from said actuating means for restraining one of said gear means such that relative rotation of the other of said gear means controls the direction of rotation of said output means.

11. A variable speed transmission and control system therefor as recited in claim 10 wherein said actuating means comprises:

(a) a plurality of servo valves with each of said servo valves being responsive to fluid pressure selectively directed from said selector means for supplying fluid control pressure to said clutch means such that fluid control pressure from one of said servo valves actuates said clutch means for restraining one of said gear means and fluid pressure from another of said servo valves actuates said clutch means for restraining another of said gear means.

12. A variable speed transmission and control system therefor as recited in claim 10 wherein said gear means comprises:

(a) a sun gear member drivably connected to said output toroidal disc;

(b) a ring gear member operably connectable with said output means;

(c) a plurality of planet pinion gears rotatably supported by a rotatable carrier member with said carrier member being operably connectable with said output means and said sun gear member and said ring gear member being in meshing engagement with said planet pinion gears.

13. A variable speed transmission and control system therefor as recited in claim 10 further comprising:

(a) means for coupling said other of said gear means for rotation with said output means when said one of said gear means is restrained by said clutch means such that said output means is driven in a direction corresponding to the direction of rotation of said one other of said gear means and said coupling means being connected to said selector means for coupling said gear means with said output means in accordance with the selective position of said selector means.

14. A variable speed transmission and control system therefor as recited in claim 9 wherein said input means comprises:

(a) a pair of co-axial input shafts each being engageable for driving connection with a motive means so that the input torque is divided between said input shafts, and one of said input shafts being connected to said input toroidal disc so that only a portion of the input torque is transmitted by said input toroidal disc to said output toroidal disc.

15. A variable speed transmission and control system therefor as recited in claim 9 wherein said speed ratio control means comprises:

(a) cam means connected to one of said pivot shafts for pivotal and translational movement therewith;

(b) said means for applying a variable differential fluid pressure control force to the ends of said pivot shafts including valve means operatively engaging said cam means;

(c) means operable for automatically rotating said valve means relative to said cam means for producing linear movement of said valve means depending on the direction of relative rotation, said valve means being effective in response to linear movement in either direction for varying the differential fluid control pressure to the ends of said pivot shafts to cause translational movement of each of said pivot shafts thereby inducing speed-ratio changing movement of the rollers with accompanying pivotal movement of their pivot shafts, and the operative engagement between said cam means and said valve means being such that translational movement of said one pivot shaft and the resulting pivotal movement of said pivot shaft are both effective through said cam means to linearly move the valve means in the opposite direction from that producing the initial variation in the differential fluid control pressure.

16. A variable speed ratio transmission and control system therefor as recited in claim 15 wherein said valve means includes:
  (a) a rotatable ratio valve body rotatably supported in a fluid control assembly; and said valve means includes;
  (b) a servo valve member supported in said rotatable ratio valve body for linear movement relative to said ratio valve body and spaced from the axis of said rotatable body for rotation relative to said axis, said servo valve member having a portion thereon engaging said cam member.

17. A variable speed transmission and control system therefor as recited in claim 16 wherein:
  (a) said cam means is provided with an inclined cam ramp for engagement with said portion of said servo valve member whereby relative rotation between said cam member and said servo member in one direction causes said servo valve member to ride up said inclined cam ramp for initiating linear movement of said servo valve member in one direction and relative rotation in a second direction causes said servo valve member to ride down said inclined cam ramp for initiating linear movement of said servo valve member in a second direction.

18. A variable speed transmission and control system therefor as recited in claim 15 wherein said means operable for automatically rotating said valve means comprises:
  (a) ratio servo valve means including a ratio servo valve member having spring means for urging said servo valve member to translate in one direction with said ratio servo valve member being connected to said valve means so that translation of said ratio servo valve member in either direction results in rotational movement of said valve means, and said ratio servo valve member also being responsive to fluid control pressure at either of its ends for causing said ratio servo valve member to translate in either of two directions in accordance with the relative magnitude of said fluid control force and the force of said spring means.

19. A variable speed transmission and control system therefor as recited in claim 18 wherein,
  (a) said selector means is connected to said ratio servo valve means for selectively supplying fluid pressure from said regulating means to either side of said ratio servo valve member such that, for one position of said selector means fluid pressure is supplied to one side of said ratio servo valve member to translate in opposition to the force of said spring means thereby urging said valve means to rotate in a first direction for linearly moving said valve means in a first direction to supply fluid control pressure to said pivot shafts to induce speed-ratio changing movement of said rollers toward a position for increasing the speed of said output means relative to the speed of said input means and for a second position of said selector means fluid pressure is supplied to the spring side of said ratio servo valve member thereby in combination with said spring force holding said ratio servo valve member translated in a position wherein said valve means is rotated to a maximum position in a second direction, and for a third position of said selector means such that no fluid pressure is supplied to said ratio servo valve member so that said ratio servo valve member translates solely in response to said spring force for rotating said valve means in said second direction whereby when said selector valve is in said second and third positions said rollers are maintained in a position of minimum output speed relative to the input speed.

20. A variable speed transmission and control system therefor as recited in claim 19 further comprising:
  (a) kickdown means including means for bleeding fluid control pressure from said ratio valve member when said selector means is in said one position such that said ratio servo valve member is caused to translate in a second direction in response to said spring force thereby rotating said valve means in said second direction, and
  (b) switch means for selectively activating and deactivating said means for bleeding fluid control pressure.

21. A variable speed transmission and control system therefor comprising:
  (a) input means for transmitting torque from a motive means;
  (b) output means for transmitting torque from said input means;
  (c) an input toroidal disc drivably connected to said input means and having a toric surface thereon;
  (d) an output toroidal disc engageable for driving connection with said output means and having a toric surface thereon facing the toric surface of said input toroidal disc;
  (e) a plurality of circumferentially-spaced rollers disposed between and in contacting engagement with said toric surfaces for transmitting torque from said input toroidal disc to said output torodial disc;
  (f) support means for each roller including a pivot shaft providing for speed-ratio changing pivotal movement across said toric surfaces, each roller support means also including means providing for movement in a second mode such that in response to movement of said rollers in said second mode, speed-ratio changing movement of said rollers is initiated;
  (g) differential gear means for transmitting torque from said output toroidal disc to said output means, said differential gear means including a plurality of gear members supported for rotation relative to said transmission axis;
  (h) clutch means for restraining one of said gear members from rotating relative to said transmission axis;
  (i) coupling means for coupling said output means to one of said gear members when another of said gear members is restrained such that direction of the torque transmitted to said output means is determined by said coupling of said output means with said one of said gear members;
  (j) hydraulic control means including means for supplying a fluid control pressure force;
  (k) means for regulating a source of fluid control pressure in accordance with the speed of one of said input and output means;
  (l) speed ratio control means for applying a variable fluid control pressure differential to the ends of each of said pivot shafts for initiating translational movement of said pivot shafts in response to changes in the relative magnitude of said fluid control pressure differential and the toric traction forces on said rollers; and
  (m) selector means having a plurality of selector positions for selectively directing fluid pressure from said regulating means for actuating said clutch means and for controlling said speed ratio control means, and said selector means being connected to said coupling means for selectively coupling said output means to one of said gear members.

22. A variable speed transmission and control means therefor comprising:
  (a) input means for transmitting torque from a motive means;
  (b) an input toroidal disc drivably connected to said input means and having a toric surface thereon;
  (c) an output toroidal disc having a toric surface thereon facing the toric surface of said input toroidal disc;
  (d) a plurality of circumferentially-spaced rollers disposed between and in contacting engagement with said toric surfaces for transmitting torque from said input toroidal disc to said output toroidal disc;
(e) support means for each roller including pivot means providing for speed-ratio changing pivotal movement of said rollers across said toric surfaces, each roller support means also including means providing for movement of the rollers in a second mode such that in response to movement of said rollers in said second mode speed-ratio changing movement of said rollers is initiated;
(f) a plurality of planet pinion gears rotatably supported on a rotatable carrier member;
(g) a ring gear member and a sun gear member in meshing engagement with said planetary gears, with said sun gear member being connected to said output toroidal disc for rotation therewith;
(h) means for selectively restraining one of said members;
(i) gear means supported for engagement with one of said members when another of said members is restrained;
(j) output means connected to said gear means with said output means having a direction of rotation determined by the engagement of said gear means with one of said members;
(k) control means including a hydraulic control pressure source for initiating speed-ratio changing movement of said rollers; and
(l) selector means hydraulically connected to said control means and including means for actuating said means for restraining one of said members and for selectively engaging said gear means with said one of said members whereby the direction of rotation and speed ratio range of said output means may be changed by regulation of said selector means.

23. A variable speed transmission and control system therefor comprising:
(a) input means and output means for transmitting torque from a motive means;
(b) an input toroidal disc drivably connected to said input means and having a toric surface thereon;
(c) an output toroidal disc engageable for driving connection with said output means and having a toric surface thereon facing the toric surface of said input toroidal disc;
(d) a plurality of circumferentially-spaced rollers disposed between and in contacting engagement with said toric surfaces for transmitting torque from said input toroidal disc to said output toroidal disc;
(e) support means for each roller including a pivot shaft providing for speed-ratio changing pivotal movement of said rollers across said toric surfaces, each roller support means also including means providing for movement in a second mode such that in response to movement of said rollers in said second mode, speed-ratio changing movement of said rollers is initiated;
(f) a planetary gear set for transmitting torque from said output toroidal disc to said output means and including a plurality of gear means supported for rotation relative to the transmission axis.
(g) clutch means for restraining one of said gear means from rotating relative to said transmission axis
(h) coupling means for coupling said output means to one of said gear means when another of said gear means is restrained such that the direction of rotation of said output means is determined by said coupling with said one of said gear means;
(i) hydraulic control means including means for supplying a fluid control pressure force, means for regulating a source of fluid control pressure in accordance with the speed of one of said input and output means, speed ratio control means for controlling the speed ratio position of said rollers, means for actuating said clutch means; and (j) selector means for selectively directing fluid control pressure from said regulating means to said speed ratio control means and to said means for actuating said clutch means, and for selectively positioning said coupling means whereby the speed ratio range and direction of rotation of said output means will be automatically controlled in accordance with the selective position of said selector means.

24. A variable speed transmission and control system therefor comprising:
(a) input means for transmitting torque from a motive means;
(b) output means for transmitting torque from said input means to a driven member;
(c) an input toroidal disc drivably connected to said input means and having a toric surface thereon;
(d) an output toroidal disc for driving said output means and having a toric surface thereon facing the toric surface on said input toroidal disc;
(e) a plurality of circumferentially-spaced rollers disposed between and in contacting engagement with said toric for transmitting torque from said input toroidal disc to said output toroidal disc;
(f) support means for each roller and including a pivot shaft providing for speed-ratio-changing pivotal movement of said rollers across said toric surfaces, each roller support means also including means providing for movement of said rollers in a second mode such that in response to movement of said rollers in said second mode, speed-ratio-changing movement of said rollers is initiated;
(g) a planetary gear set for transmitting torque from said output toroidal disc to said output means and including a carrier member having a plurality of rotatably supported planet pinion gears thereon, a sun gear connected to said output toroidal disc for rotation therewith and in meshing engagement with said planet pinion gears, and a ring gear in meshing engagement with said planet pinion gears;
(h) clutch means for restraining said carrier member and said ring gear member;
(i) coupling means for coupling said carrier member with said output means when said ring gear member is restrained and for coupling said ring gear member with said output means when said carrier member is restrained;
(j) means for providing a source of fluid pressure whose magnitude varies in accordance with the speed of said input means;
(k) speed ratio control means including cam means connected to one of said pivot shafts for pivotal and second mode movement with said pivot shaft, a servo valve member supported in a rotatable valve housing for rotation therewith relative to said cam means and having a portion thereof engaging said cam means so that relative rotation between said cam means and said servo valve member produces linear movement of said servo valve member, and said servo valve member being operable for supplying a variable differential fluid pressure control force to the ends of each of said pivot shafts such that in response to changes in the relative magnitude of the differential fluid pressure force on each pivot shaft second mode movement of said pivot shafts is initiated, ratio valve means responsive to forces inducing translational movement thereof for automatically rotating said valve housing to produce linear movement of said servo valve member in a direction depending upon the direction of relative rotation between said servo valve member and said cam means, and said servo valve member being effective in response to linear movement thereof for changing the differential fluid pressure control force at the ends of said pivot shafts to cause translational movement of each of said pivot shafts thereby inducing speed ratio-changing-movement of the rollers with accompanying pivotal movement of the pivot shafts;

(l) selector means having a first position for directing fluid control pressure from said regulating means to one side of said ratio valve means for inducing translational movement of said ratio valve means in a first direction, a second position for directing fluid control pressure from said regulating means to the other side of said ratio valve means for inducing translational movement of said ratio valve means in a second direction and a third position wherein fluid control pressure from said regulating means is blocked from said ratio valve means;

(m) servo valve means for actuating said clutch means with said servo valve means being connected to said selector means for receiving fluid control pressure from said selector means for actuating said clutch means to restrain said ring gear member when said selector means is in its first position and for actuating said clutch means to restrain said carrier member when said selector means is in its third position.

5. A variable speed transmission comprising:

(a) input means including first and second shafts for transmitting torque from a motive means and including means for dividing the input torque between said first and second shafts;

(b) an input toroidal disc member drivably connected to said first shaft with said input toroidal disc member having a toric surface thereon;

(c) an output toroidal disc member having a toric surface thereon facing the toric surface on said input toroidal disc member and said output toroidal disc member being operably connected to an output means;

(d) a plurality of circumferentially-spaced rollers disposed between and in contacting engagement with said toric surfaces for transmitting torque from said input toroidal disc member to said output toroidal disc member;

(e) support means for each roller including pivot means providing for speed-ratio-changing pivotal movement of said rollers across said toric surfaces in response to changes in the relative magnitude of the forces acting on said rollers;

(f) differential gear means for transmitting torque from said output toroidal disc member and including a plurality of gear members;

(g) clutch means for selectively restraining one of said gear members so that, when said one gear member is restrained, torque is transmitted from said output toroidal disc member through a second of said gear members and when said second gear member is restrained, torque is transmitted from said output toroidal disc member through said one gear member; and (h) coupling means for transmitting torque from said differential gear means to an output shaft and said coupling means including gear means supported for selective driving engagement with said one gear member and said second gear member so that, when said second gear member is restrained, said gear means is driven by said one gear member and in the same direction of rotation as said input toroidal disc member and, when said one gear member is restrained, said gear means is driven by said second gear member and in opposite direction of rotation relative to said input toroidal disc member, and said gear means also being in driving engagement with said second shaft so that the torque divided between said first and second shafts is recombined through said gear means for transmission to said output shaft.

No references cited.

DON A. WAITE, *Primary Examiner.*